United States Patent [19]

Gregory et al.

[11] Patent Number: 5,338,566
[45] Date of Patent: Aug. 16, 1994

[54] METHOD UTILIZING A CERAMIC FOR TEMPERATURE MEASUREMENT

[75] Inventors: Otto J. Gregory, Wakefield, R.I.; Joseph J. McCauley, III, West Haven, Conn.

[73] Assignee: Avco Corporation, Providence, R.I.

[21] Appl. No.: 870,811

[22] Filed: May 28, 1992

Related U.S. Application Data

[62] Division of Ser. No. 461,252, Jan. 5, 1990, Pat. No. 5,135,795.

[51] Int. Cl.$^5$ .............................................. B05D 5/06
[52] U.S. Cl. ...................................... 427/8; 427/162; 427/407.1
[58] Field of Search ....................... 427/162, 407.1, 8

[56] References Cited

U.S. PATENT DOCUMENTS

| | | | |
|---|---|---|---|
| 2,261,473 | 11/1941 | Jennings | 252/370 |
| 2,269,038 | 1/1942 | Perry | 116/114 |
| 2,739,909 | 3/1956 | Rosenthal | 117/161 |
| 2,809,116 | 10/1957 | Laskowski | 106/19 |
| 2,928,791 | 3/1960 | Loconti | 252/408 |
| 3,377,165 | 4/1968 | Workman | 96/29 |
| 3,415,122 | 12/1968 | Yee | 73/356 |
| 3,661,142 | 5/1972 | Flam | 73/356 |
| 3,724,272 | 4/1973 | Steele | 73/358 |
| 3,874,240 | 4/1975 | Rembaum | 73/356 |
| 4,228,349 | 7/1981 | Sander | 356/44 |
| 4,301,654 | 11/1981 | Buirley et al. | 260/29.4 |
| 4,302,971 | 12/1981 | Luk | 73/356 |
| 4,307,607 | 12/1981 | Saaski et al. | 73/356 |
| 4,344,909 | 8/1982 | De Blauwe | 264/230 |
| 4,416,940 | 11/1983 | Loye et al. | 427/267 X |
| 4,448,204 | 5/1984 | Lichtenstein | 128/736 |
| 4,459,046 | 7/1984 | Spirg | 374/162 |
| 4,576,486 | 3/1986 | Dils | 374/131 |
| 4,673,299 | 6/1987 | Dakin | 374/131 |
| 4,689,483 | 8/1987 | Weinberger | 250/231 R |
| 4,744,246 | 5/1988 | Busta | 73/204 |
| 4,813,781 | 3/1989 | Tissier et al. | 356/354 |
| 5,135,795 | 8/1992 | Gregory et al. | 428/195 |

OTHER PUBLICATIONS

"Thermindex Temperture Indicating Paints", Synthetic & Industrial Finishes Ltd., Imperial Works, Wetford, Herts., England, Oct. 17, 1985.

Two unnumbered pages and pp. Q-1 through Q-14 from "Omega Complete Temperature Measurement Handbook and Encyclopedia," vol. 26, copyright 1988, by Omega Engineering, Inc.

*Primary Examiner*—Michael Lusignan
*Attorney, Agent, or Firm*—Perman & Green

[57] ABSTRACT

A ceramic thin film applique provided on a substrate effects an optical transition at a predetermined elevated temperature. Below the transition temperature, the applique exhibits distinctive visual and physical characteristics, for example color, opaqueness and/or texture, but when the substrate is heated to the transition temperature, the visual and physical characteristics of the applique change noticeably. The invention encompasses the composition of the applique itself, as well as the methods of making the applique, applying it to the substrate, and using it.

10 Claims, 3 Drawing Sheets

- \# 005 ▨ OPAQUE DARK GREEN COAT, COARSE TEXTURE
- \# 010 ▨ OPAQUE TAN COAT, COARSE TEXTURE
- \# 017 ▨ OPAQUE DARK GREEN COAT, COARSE TEXTURE
- \# 023 ☰ OPAQUE LIGHT BLUE COAT, COARSE TEXTURE
- \# 028 ☰ OPAQUE BLUE COAT, COARSE TEXTURE
- ☐ TRANSPARENT / SEMI-TRANSPARENT, SMOOTH SURFACE TEXTURE

METHOD UTILIZING A CERAMIC FOR TEMPERATURE MEASUREMENT

This is a continuation of copending application Ser. No. 07/461,252 filed on Jan. 5, 1990, now U.S. Pat. No. 5,135,795, patented Aug. 4, 1992.

BACKGROUND OF THE INVENTION

1. Field of the Invention

The present invention relates generally to temperature responsive ceramic coatings for application to the surface of a substrate. At ambient temperatures, each individual coating exhibits a distinctive color and texture. When the temperature of the substrate on which the coating is applied is raised to, or above, a predetermined transition temperature, visual and physical characteristics of the coating change in a distinct manner, thereby indicating that the predetermined transition temperature has been reached.

2. Description of the Prior Art

There are numerous known techniques for measuring the temperature of a surface. For example, thermocouples have long been used for this purpose. However they are objectionable for certain applications because they occupy substantial space, are relatively fragile, require long leads subject to entanglement, and cannot withstand excessive temperatures for extended periods of time.

A modern form of an old temperature measuring concept is disclosed in U.S. Pat. No. 3,724,272 directed toward a Fusible pyrometric device for measuring the amount of heat applied during a heat treatment process, such as the firing of ceramic ware in a kiln.

Temperature sensing of a substrate such as an electronic circuit is oftentimes desirable. U.S. Pat. No. 3,8741,240 accomplishes such sensing by dispersing in a carrier material such as glass a thermochromic composition comprising particles of an electron-donor compound weakly associated with particles of an electron-acceptor compound. The carrier material is suitably attached to the substrate and seals the compounds from the effects of the environment while permitting the compounds to weakly associate at a first temperature to form a first indicative color and disassociate at a lower temperature to form a second indicative color.

A variety of temperature measuring devices have also been devised which employ fiber optic arrangements for illuminating and detecting an object whose radiance is a measure of its temperature. Such objects may be in relatively inaccessible locations and examples of such temperature measuring devices are disclosed in U.S. Pat. Nos. 4,278,349; 4,307,607; 4,576,486; 4,673,299; and 4,689,483.

Also of interest in providing a complete background of developments which have lead to the present invention are U.S. Pat. Nos. 2,739,909; and 3,377,165. In the former instance, there is a disclosure of a thermo-sensitive paper with a substantially opaque organic coating on its outer surface which softens under a heated stylus and becomes translucent at the region scribed by the stylus to expose a substrate material. The latter patent concerns a somewhat similar concept, and relates to a light sensitive copy sheet which comprises a supporting substrate or carrier and an initially opaque and porous organic binder layer. On exposure to a light-image and to a moderately elevated temperature, the organic binder layer is selectively transparentized at the light-struck areas, thereby forming an image.

Temperature sensing patches which change color according to temperature are disclosed in U.S. Pat. No. 4,459,046. In this instance, using a pressure sensitive adhesive coating, the patches are applied to a person's skin or to some other supporting surface whose temperature is to be measured. Similar devices which utilize incapsulated liquid crystals are disclosed in U.S. Pat. Nos. 3,661,142; 4,302,971; and 4,448,204.

Thermal indicators of the type wherein an organic coating is applied to a base and either reversibly or irreversibly changes its appearance at a predetermined elevated temperature due to physical changes occurring therein at such temperatures have long been known. U.S. Pat. Nos. 2,261,473; 2,269,038; 2,809,116; 2,928,791; 4,301,054; and 4,344,909 are representative of this form of indicator.

Such indicators which are sometimes referred to as "thermal paints" employ mixtures of organic dyes or pigments to effect changes of color over a wide range of temperatures. When the temperature of a treated surface is raised, the original color of the pigment changes sharply at a definite point and the new color persists after the surface has cooled down. As in the instance of the present invention, thermal paints are of value in those instances in which a change of temperature only is desired to be ascertained, usually at some critical point or points, the exact temperature over a considerable range not being of importance. Unfortunately, in general, thermal paints possess a number of drawbacks which the present invention seeks to avoid. Specifically, in many instances, thermal paints often adhere poorly to a substrate, are toxic, and require use of costly materials. They also may be reversible, sometimes being subject to chemical change depending upon the particular gases present in the environment in which they are required to operate. As an added drawback, thermal paints do not customarily exhibit a texture change simultaneously with a change of color. Furthermore, the longer that thermal paints are subjected to a given elevated temperature after lapse of an initial period of time customary to assure substantial temperature uniformity throughout the substrate, the lower the transition temperature at which the color change occurs. Indeed, with thermal paints, this rate of lowering of the transition temperature is quite rapid and is aggravated at higher temperatures.

A particularly pertinent prior art reference is U.S. Pat. No. 3,415,122 which discloses a temperature indicator in the form of a ceramic film for sensing and recording temperatures in the range of 900° C.-1400° C. The film may be attached, for example, to the outer skin of a space vehicle. When recovered after re-entry of the space vehicle, the indicator is cleaned, polished, and photomicrographed, then compared with calibration photomicrographs to determine the maximum temperature to which the space vehicle was subjected. Of course, it will be appreciated that such a procedure is extremely time consuming and labor intensive and, therefore, costly, nor are results readily available.

SUMMARY OF THE INVENTION

The present invention was conceived and reduced to practice in an effort to improve upon the prior art as just discussed. To this end, the invention relates to a ceramic thin film coating or applique provided on the surface of a substrate which effects an optical transition at a predetermined elevated temperature. Below the transition temperature, the applique exhibits a distinctive appearance, color, opaqueness and/or texture, but when the substrate is subjected to the transition temperature, the applique changes its visual and physical characteristics in a distinctive manner indicative of that temperature. The invention encompasses the composition of the applique itself, as well as the methods of making the applique, applying the applique to the substrate, and using the applique.

Thin film appliques utilizing the sintering of ceramic particles to effect an optical-transition may be used to measure, for example, the surface temperature of gas turbine engine components such as starors, vanes, nozzles, and combustion chamber walls which customarily operate in the approximate temperature range of 500°-2500° F. The appliques of the invention are of particular benefit for obtaining temperature readings of relatively inaccessible components, oftentimes with the components moving at a high rate of speed. Initially, the applique appears colored or opaque to the naked eye due to the scattering of incident light by the micron-sized individual particles in the coating. However, when transition temperature for the applique is reached and maintained for a specified period of time, for example, 20 minutes, visual and physical changes occur in the appliques when discrete ceramic particles unite or coalesce and form a continuous glassy film. The resulting glassy film exhibits a change in color, light transmission, and/or a texture change when the transition temperature is reached. According to a preferred embodiment, the thin film appliques are uniquely identified by coloring the ceramics according to the transition temperature desired to be indicated, and this is accomplished by doping the bulk glassy ceramics with different metallic oxides.

This thin film applique technique for indicating temperature may employ a multiple layer system with each layer having a specific purpose. In such an instance, a base coat is initially applied, followed, in succession, by a transition coat and a polymer over coat. The base coat provides adhesion to the metal substrate for the transition coat at both ambient temperature and at elevated temperatures. The transition coat provides the visual color and texture changes while the polymer over coat provides low temperature adhesion and erosion protection. However, in a preferred embodiment of the invention, the base coat is the transition coat such that application of the thin film applique to an underlying substrate can be performed in a single step.

Features and benefits of the invention include its inertness to chemical interactions, including resistance to oils. Also, the invention has superior properties of adherence to its substrate, is less susceptible to erosion, provides increased accuracy and resolution, is generally less expensive to fabricate, and, as noted, provides texture change as well as color change following transition. Additionally, the temperature indicating appliques of the invention can be relatively easily tailored to have a thermal expansion similar to that of its underlying substrate.

Yet a further feature of the invention resides in the fact that the rate of reduction of transition temperature after prolonged exposure of an applique bearing substrate to an elevated temperature is markedly less that that exhibited by conventional thermal paints. While known thermal paints have a substantial tendency to drift to indicate lower temperatures than initially intended with the passage of time, the appliques of the invention are more refractory and significantly more likely to maintain their originally intended indicated temperatures.

Other and further features, advantages, and benefits of the invention will become apparent in the following description taken in conjunction with the following drawings. It is to be understood that the foregoing general description and the following detailed description are exemplary and explanatory but are not to be restrictive of the invention. The accompanying drawings which are incorporated in and constitute a part of this invention, illustrate one of the embodiments of the invention, and, together with the description, serve to explain the principles of the invention in general terms. Like numerals refer to like parts throughout the disclosure.

DETAILED DESCRIPTION OF THE PREFERRED EMBODIMENTS

Figure 1:
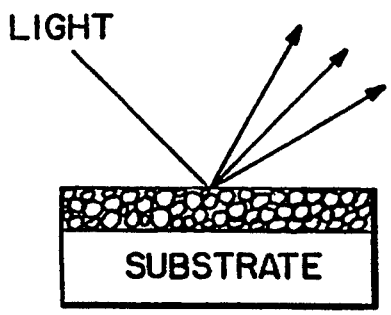
FIG. 1 is a diagrammatic cross section view of a substrate to which an applique of the invention has been applied and existing at room temperature.
Figure 2:
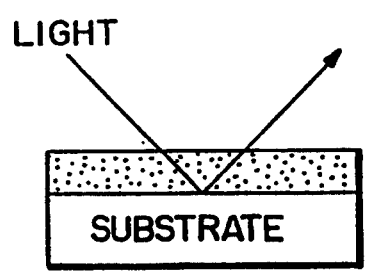
FIG. 2 is a diagrammatic cross section view, similar to FIG. 1, illustrating a substrate and its temperature indicating applique after it has been subjected to the transition temperature.

The thin film thermal appliques of the invention are based on the sintering of glassy particles which induces, in one instance, an opaque to clear transition in the applied coating. As depicted in FIG. 1, the initial opacity of the thermal applique is attributed to the scattering of light by discrete ceramic glass particles. Once the transition temperature has been achieved, as seen in FIG. 2, the particles sinter together forming a continuous glassy film that is transparent. This effort gives rise to a color transition, when different initial colors are employed.

Sintering is a phenomenon where finely divided particles coalesce under the influence of viscous forces to form a continuous dense solid. The driving force for the densification of these particles is the reduction in surface energy or, more specifically, surface area. The extent of densification is a function of time, temperature and composition of the ceramic particles.

Different transition temperature thermal appliques are developed by changing the composition of the ceramic/glass particles within the thin coating. This is achieved by the addition of refractory glass formers (SiO₂) to the ceramic/glass mixture before grinding and dispersion. Silica (SiO₂) has a very high melting point (approximately 3000° F.) and is an excellent glass network former. Therefore, by adding incremental amounts of silica to the mixture, the transition temperature of the thermal applique will be increased. To identify the different thermal appliques, various metal oxides are added to give the coating its distinctive color, i.e. to distinguish between other thermal appliques. Some metals when further oxidized in the glass matrix give rise to color changes, due to the different oxidation states possible. These appliques give rise to discrete color changes (e.g. blue to grey) at the transition temperature where sintering occurs. This is due to the fact that cation diffusion at the transition temperature is extremely rapid. However, once the applique undergoes a transition and forms a continuous film, no further color changes occur. The diffusion lengths at this point are much longer essentially terminating further changes.

The following table is a partial listing of colorant oxides which may be used for purposes of the invention, the colors which they exhibit, and preferred weight percentages for achieving the desired result:

| Oxide | Weight % | Color |
|---|---|---|
| Chromium | 2.0 | green |
| Cobalt | 0.5 | blue |
| Copper | 0.5–0.8 | turquoise |
| Iron | 2.0–10.0 | tan to black |
| Manganese | 4.0 | purple |

The glass particles are sized and mixed with an organic binder which gives the technique its thick slurry consistency. This binder leaves essentially no residue after combustion and holds the glassy particles together so they adhere to the substrate at low temperature.

A transition coating may be applied on top of another glassy coat, called the base coat. This layer is made of low melting temperature glassy particles that have a thermal expansion coefficient similar to the substrate. Adhesion between the base coat and the substrate is a result of a chemical reaction at the interface. This interface is theorized to be a monolayer of substrate metal oxide that provides a transition from the metallic bonds of substrate metal to the covalent/ionic bonds of the base coat. Since the base coat melts at a lower temperature than the transition coating, the transition layer interacts with the base coat, such that the base coat wets the transition glassy particles and is responsible for the high temperature adhesion between the two coats. Although there is high temperature adhesion between the two coats, an additional component is mixed with the transition coating to promote low temperature adhesion and erosion resistance which burns off leaving very little residue.

The transition coatings may be made, for example, from three basic glass compositions obtained from Mobay Corporation of Pittsburgh, PA: PB-83, P-786, and P-1413. These glass compositions, or formers, are composed substantially of SiO₂ with lesser quantities of glass forming metallic oxides including some or all of the following: PbO, CaO, SrO, and MgO. In this example, PB-83 is used for transition temperatures between 1000° F. and 1200° F. and also for the base glass in this temperature range. The P-786 and P-1413 glasses are employed in the range from 1200° F. to 1700° F. These glasses are mixed with pure silica to achieve higher transition temperatures. This is accomplished by weighing appropriate amounts of the main glass (PB-83, P-786 and P-1413), and silica along with the metal oxide, mixing and ball milling. The ball mill allows the particles of each component to come into intimate contact with each other, thus providing uniform composition prior to melting. The time of ball milling is about one hour.

The mixture is extracted from the ball mill and placed in a platinum crucible. Platinum is used because of its very high melting point and excellent chemical inertness in the presence of metallic oxides at very high temperatures. The crucible is placed in the furnace (oxidizing atmosphere) already at the desired temperature (usually greater than 2300° F.) for a specified time, for example one to one and one half hours. The mixture melts in the crucible forming a continuous liquid phase. After the crucible has reached the desired temperature for the required amount of time, the crucible is quenched. This is achieved by taking the "red hot" crucible and dropping it into cold water. This quenching is so rapid that the material in the crucible does not have a chance to crystallize and the material "frits", allowing for easy removal.

The glassy material is removed from the crucible and crushed with a suitable mill with a 250 micron screen in place. The particles are placed into a ball mill and milled an additional period of time, four additional hours by way of example. The crushed glass is separated in a suitable manner until uniform particles smaller than 38 microns across are obtained. The uniformity of glass particle size is desirable for a sharp optical transition.

Figure 4:
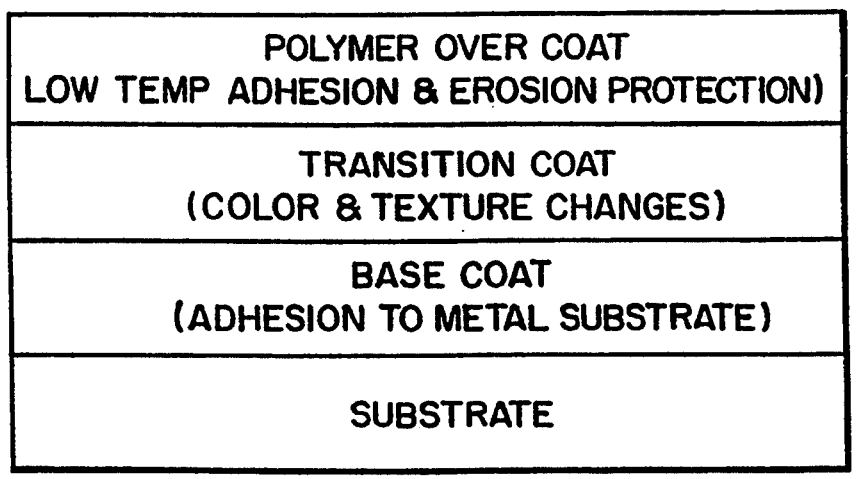
FIG. 4 is a diagrammatic cross section view of a substrate to which an applique of the invention has been applied, illustrating the three layers of a typical applique.
Figure 3:
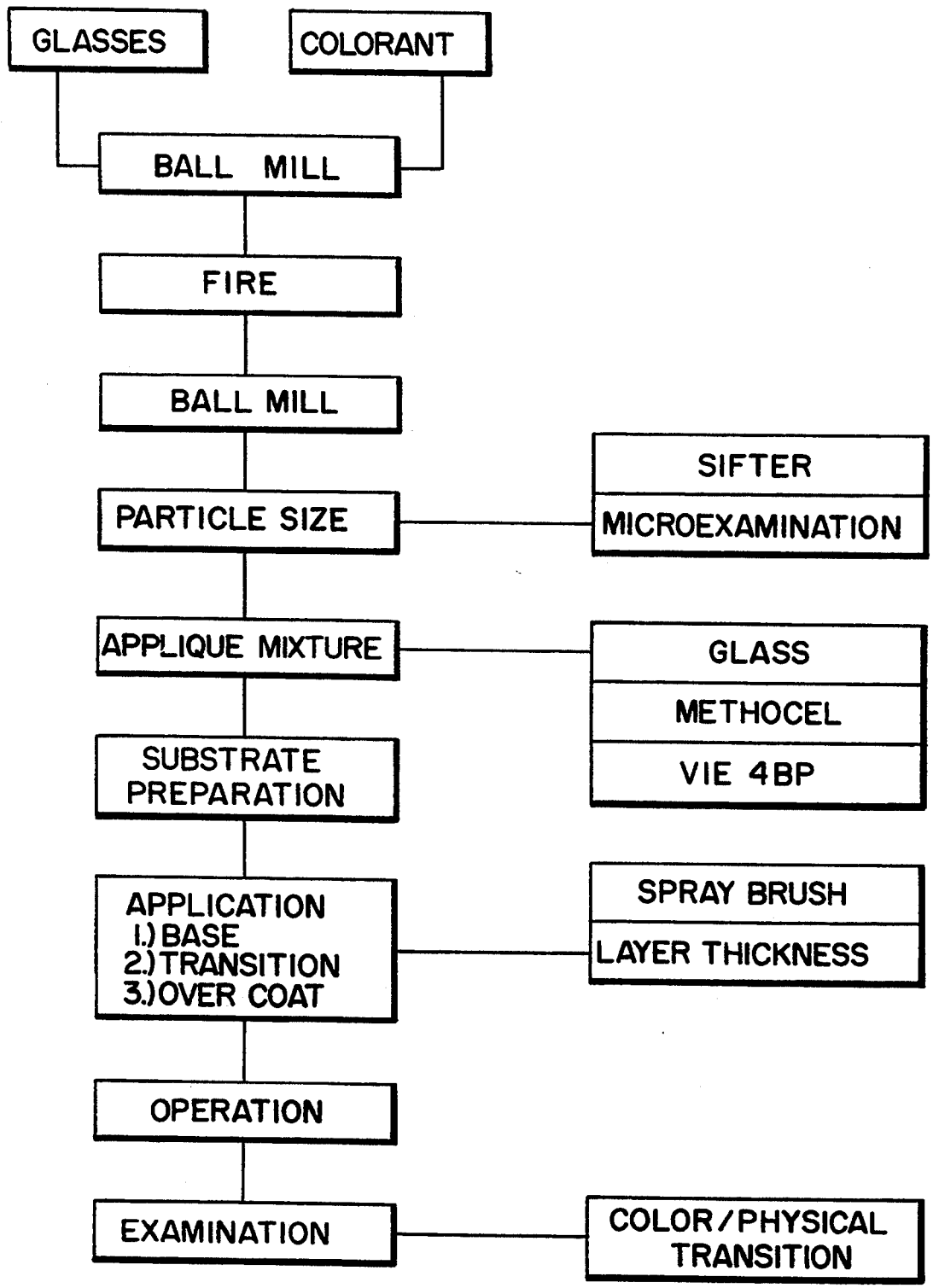
FIG. 3 is a flow chart of an entire process depicting the invention.

The particles smaller than 38 microns across are mixed with an organic binder which serves as a polymeric over coat. This binder may be, for example, a mixture composed of a water soluble cellulose acetate sold by Dow Chemical Corporation of Midland, MI under the trademark METHOCEL, a silanol monomer sold under the trademark VIE 4BP solid by Applied Concepts, Inc. of Miami, FL and distilled water. These three materials are preferably mixed in a ratio of 5 grams glass particles to 14.5 milliliters of METHOCEL liquid and 0.5 milliliter of VIE 4BP monomer. The mixture is shaken vigorously until a slurry consistency is obtained, after which final application is achieved, preferably by spraying. A flowchart of the entire process is provided in FIG. 3. FIG. 4, depicts, schematically, a substrate to which three coatings have been applied, first, the base coat, then, the transition coat, and finally, the polymer over coat. In actual fact, these coatings may be applied one at a time successively, or in two layers, or in one application. In a typical applique, the base coat will have a thickness of approximately 20 microns, the transition coat will have an approximate thickness of 40 microns, and the top coat will have a thickness of approximately 50 microns. The over coat promotes adhesion of the applique up to the point at which the glass ceramic particles of the base coat bond to the metal substrate, that is, up to about 400°–500° F. The polymer over coat is chemically stable up to approximately 1000° F. at which point it decomposes cleanly and forms gases with substantially no solid residue. The base coat melts at temperatures in the range of 1000° F.–1200° F. and assures a strong bond between the transition coat and the substrate at elevated temperatures, that is, in the transition temperature range.

Experience with the applique temperature indicating system of the invention indicates that a base coat is not a requirement of the invention because of the presence of metal oxides in the transition coat which have an infinity to the metal surface of the substrate. Additionally, it has been learned that the polymer over coat can be mixed with the transition coat and, in this manner, the applique can be applied in a one step procedure.

In the actual practice of the invention, depending upon the composition of the glass forming ceramic material and of the colorant metallic oxides used, an applique which is initially opaque may, following transition, exhibit any one of three different visible changes. In a first instance, the applique may become transparent so as to transmit the color of the substrate. In a second instance, the applique may become transparent but with its own color change such that the color transmitted is a combination of its own new color and that of the substrate. In a third instance, the applique remains opaque but exhibits a color change. Each instance of transitional changes of the applique is accompanied by textural changes which can be measured by means of a profilimeter. Hence the appliques of the invention offer both visual and physical characteristics for indicating that a transition temperature has been reached or exceeded by the substrate.

Figure 5:
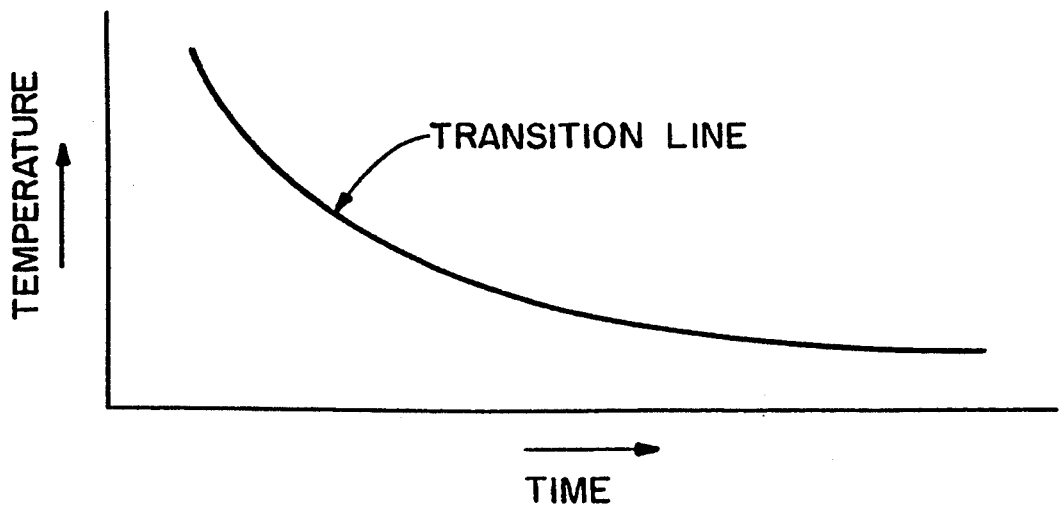
FIG. 5 is a typical graph of time versus transition temperature for an applique of the invention.

According to the invention, numerous appliques are applied to a prepared substrate. Thereupon, the substrate is exposed to an elevated temperature environment for a designated time interval, typically, for 20 minutes. The substrate is then removed from the elevated temperature environment at the end of the designated time interval and the visual and physical changes to the applique are noted. From a graph of time versus transition temperature for each applique, as illustrated in FIG. 5, a temperature can be assigned to the transition region, that is, the region where the particular applique is located on the substrate. Since numerous appliques were initially applied to the substrate, many isotherms can be obtained which provide a temperature record for the substrate.

Figure 6:
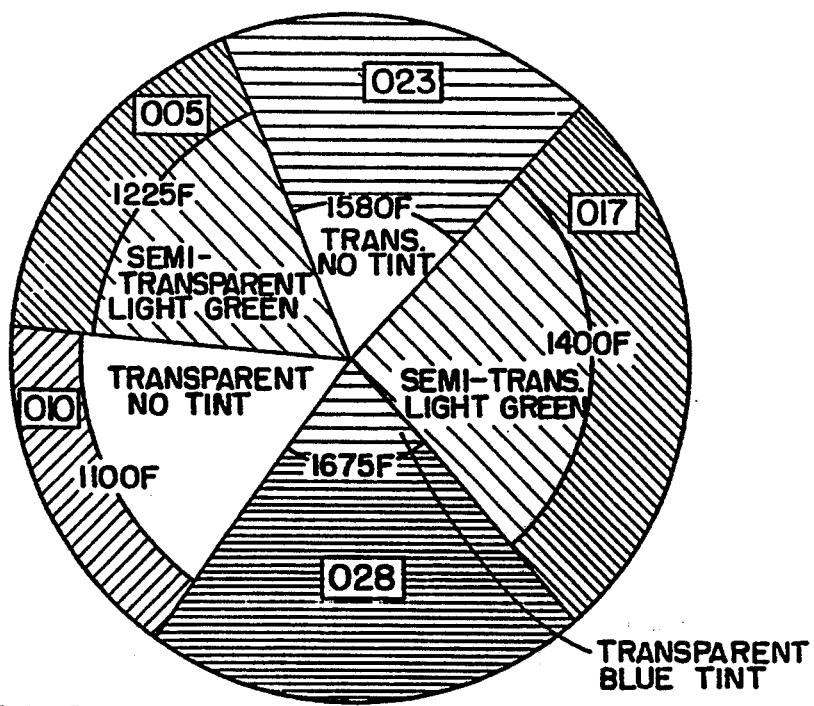
FIG. 6 is a plan view of a circular test coupon bearing a plurality of ceramic thin film appliques, the center of the test coupon having been heated to an elevated temperature.
Figure 7:
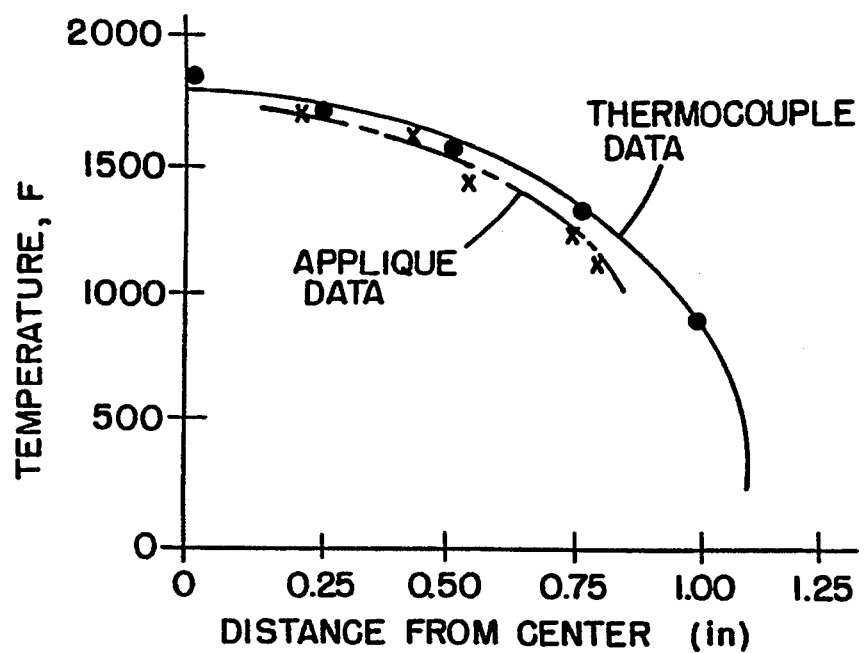
FIG. 7 is a graph presenting temperature versus distance from the center of the test coupon illustrated in FIG. 6 and comparing the temperature indicated by conventional thermocouples and by the appliques of the invention.

In order to more completely disclose the present invention, the following example is provided, with particular reference to FIGS. 6 and 7. As depicted in FIG. 6, a test coupon composed of a nickel base super alloy as a substrate has been coated with five different appliques, each occupying a defined sector of the surface of the substrate. The appliques are arbitrarily numbered in order to distinguish them from each other, namely 005, 010, 017, 023, and 028. The composition of each applique is as follows:

| #005 | #010 | #017 |
|---|---|---|
| 55.2% PB83 | 19.6% PB83 | 99.28% P786 |
| 36.8% P786 | 78.4% P786 | 0.72% $Cr_2O_3$ |
| 8.0% $Fe_2O_3$ | 2.0% $Cr_2O_3$ | |

| #023 | #028 |
|---|---|
| 68.3% P786 | 46.4% P786 |
| 29.7% $SiO_2$ | 52.6% $SiO_2$ |
| 4.3% $CuCO_3$ | 1.0% CoO |
| 0.7% $Fe_2O_3$ | |

A propane torch was applied to the center of the reverse side of the test coupon and held there until a steady state temperature profile was obtained on the coupon. FIG. 6 is indicative of the condition of the appliques upon removal of the torch. The following table presents the results of the test:

| No. of Applique | Distance from center* | Transition Temperature** | Condition After Transition |
|---|---|---|---|
| 005 | 0.754 in. | 1225° F. | Semi-Transparent; light green |
| 010 | 0.818 in. | 1100° F. | Transparent; no tint |
| 017 | 0.571 in. | 1400° F. | Semi-Transparent; light green |
| 023 | 0.452 in. | 1580° F. | Transparent; no tint |
| 028 | 0.237 in. | 1675° F. | Transparent; blue tint |

*transition line
**approx. range: +/− 10° F.

It is noteworthy that for each applique, not only is there a change in color and/or opaqueness, but there is also a definite change in texture which can be felt and measured.

FIG. 7 is a plot of temperatures recorded by thermocouples at the center of the test coupon and at radial distances in one-quarter inch ascending order versus data obtained from the appliques themselves. It clearly depicts the accuracy achieved by the appliques.

While a preferred embodiment of the invention has been disclosed in detail, it should be understood by those skilled in the art that various other modifications may be made to the illustrated embodiment without departing from the scope of the invention as described in the specification and defined in the appended claims.

We claim:

1. A method of providing on the surface of a substrate a thermally responsive coating capable of at least one of visually and physically indicating an elevated temperature to which the substrate is subjected, said method comprising the steps of:

melting glass forming ceramic material substantially comprising $SiO_2$ to form a molten mass;

infusing into the molten mass material comprised of at least one colorant metallic oxide in an amount up to approximately 5% by weight of the molten mass;

quenching to the solid state the molten mixture composed of the ceramic material and the colorant metallic oxide;

crushing and classifying the solid state mixture into a powder comprised of particles in the size range of less than approximately 38 microns; and applying the powder mixture to the surface of the substrate as a film.

2. A method as set forth in claim 1 wherein the film applied to the surface of the substrate has a thickness approximately in the range of 20 micrometers to 100 micrometers.

3. A method as set forth in claim 1 including the step of:

selecting for the infusing step one or more colorant metallic oxides which together cause the film applied to the surface of the substrate to exhibit at least one of a distinctive visual and physical characteristic at temperatures below a transition temperature.

4. A method as set forth in claim 3 wherein the step of selecting one or more colorant metallic oxides includes the step of correlating the distinctive color exhibited by the film with a particular predetermined transition temperature.

5. A method as set forth in claim 1
wherein the step of applying the powder mixture to the surface of the substrate includes the steps of:
transporting the powder mixture to the surface of the substrate supported in a fluid medium; and
bonding the powder mixture to the surface of the substrate to form the film.

6. A method as set forth in claim 5
wherein the step of transporting includes the step of spraying the fluid medium with the powder mixture suspended therein onto the surface of the substrate.

7. A method as set forth in claim 1
wherein the glass forming ceramic material is substantially comprised of $SiO_2$ and includes glass forming metallic oxides;
wherein a first relative composition of $SiO_2$ and glass forming metallic oxides result in the thermally responsive coating indicating a first transition temperature; and
wherein a second relative composition of $SiO_2$ and glass forming metallic oxides result in the thermally responsive coating indicating a second transition temperature.

8. A method of providing on the surface of a substrate a thermally responsive coating capable of at least one of visually and physically indicating to the unaided eye an elevated transition temperature to which the substrate is subjected, said method comprising the step of:
applying to the surface of the substrate a transition layer comprising a mixture of glass forming ceramic material and one or more colorant metallic oxides for indicating an elevated transition temperature to which the substrate is to be subjected.

9. A method as set forth in claim 8 including the step, before the step of applying a transition layer to the surface of the substrate, of:
applying a base coat comprising low melting temperature glassy particles intermediate the transition layer and the substrate for bonding the transition film to the substrate.

10. A method as set forth in claim 8 including the step, after the step of applying a transition layer to the surface of the substrate, of:
applying a polymer over coat overlying the transition film for protection of the transition film and for bonding of the transition film to the substrate at temperatures below the transition temperature.

* * * * *